Nov. 3, 1964 E. W. VOLAND 3,154,967
SHAFT POSITIONING DEVICE
Filed March 2, 1964 2 Sheets-Sheet 1

INVENTOR.
ELMO W. VOLAND
BY
ATTORNEY

Nov. 3, 1964

E. W. VOLAND 3,154,967

SHAFT POSITIONING DEVICE

Filed March 2, 1964

INVENTOR.
ELMO W. VOLAND

BY

ATTORNEY

United States Patent Office 3,154,967
Patented Nov. 3, 1964

3,154,967
SHAFT POSITIONING DEVICE
Elmo W. Voland, Indianapolis, Ind., assignor to P. R. Mallory & Co., Inc., Indianapolis, Ind., a corporation of Delaware
Filed Mar. 2, 1964, Ser. No. 348,693
9 Claims. (Cl. 74—527)

This invention relates generally to shaft positioning devices and has specific pertinence to the means and method for indexing and axially-movable rotary shaft in any one of a plurality of axial locations.

Although the present invention is adaptable to a multiplicity of uses, it finds particular advantage in time switch mechanisms. Those familiar with the timer switch art will recognize the need for axial movement of the timer shaft to provide actuation of a line switch or similar function. Therein it is necessary to permit manual shifting of the timer shaft between accurately established axial limits. The retaining means must be sufficiently rigid to maintain proper shaft location, yet the drag torque resulting from shaft contact should be minimal.

One means of shaft location known to the timer art comprises a U-shaped wire clip affixed to a pair of clamping studs, the latter being cantilevered to a structural plate in the timer assembly. The clip is disposed in a plane perpendicular to the axis of the timer shaft with the free ends extending over the shaft. The clamping action of the studs biases these ends against the shaft periphery. Circumferential grooves in the timer shaft are provided to locate the shaft in the desired axial position as the clip ends become engaged therewith. Such a device, although effective for the intended purpose, requires three separate parts, and special assembly procedures are necessary to affix the studs and insure correct spring bias within the clip.

In contradistinction thereto, one embodiment of the present invention discloses a unitary spring clip member having pre-formed mounting tangs adapted to readily engage holes in the timer end plate. The free ends of the clip are rounded on the inside face to engage circumferential grooves in the control shaft of the timer, thus providing positive indexing in response to manual movement in the axial direction. Substantial reduction in cost is afforded by this construction, and rapid assembly is accomplished by merely compressing the clip to allow engagement of the mounting tangs.

It is an object of the present invention, therefore, to provide a shaft positioning device of unitary construction adapted to resiliently engage circumferential grooves in the shaft for axial indexing.

It is another object of the present invention to provide a shaft positioning device having integral tangs for mounting purposes.

Yet another object of the present invention is to provide a shaft positioning device capable of maintaining a desired axial shaft location with minimum resistance to rotation imposed by the clamping action.

Still another object of the present invention is to provide a unitary positioning clip capable of simple installation with accuracy of resulting alignment.

Yet another object of the present invention is to provide a shaft indexing clip of unitary construction which can be readily fabricated and formed at low cost.

Yet another object of the present invention is to provide a shaft indexing clip wherein the integral mounting tangs are pre-formed, and do not require deformation after engagement with their respective mounting holes.

Still another object of the present invention is to provide a shaft indexing clip wherein the mounting tangs may be staked for positive retention.

Yet another object of the present invention is to provide an alternate construction for the indexing clip wherein a hairpin type spring wire cooperates with the basic U-shaped member.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in connection with the accompanying figures of the drawing wherein like reference characters describe elements of similar function therein, and wherein the scope of the invention is determined rather from the dependent claims.

Generally speaking, the invention describes an indexing means for an axially movable shaft having grooves cut therein. The indexing means is mounted on a base having apertures cut therethrough. The indexing means comprises a U-shaped, unitarily formed member having free end portions. The free ends have a pair of dependencies extending from a side thereof adapted to penetrate the base through the apertures. cut therethrough. There are clutching means on said dependencies adapted to grip the base so as to affix the indexing means in an upright manner thereon. Further, there are gripping means connected to the free ends of the bowed main portion which are adapted to fall within the grooves of the shaft to position the same upon axial movement thereof.

Figure 1:
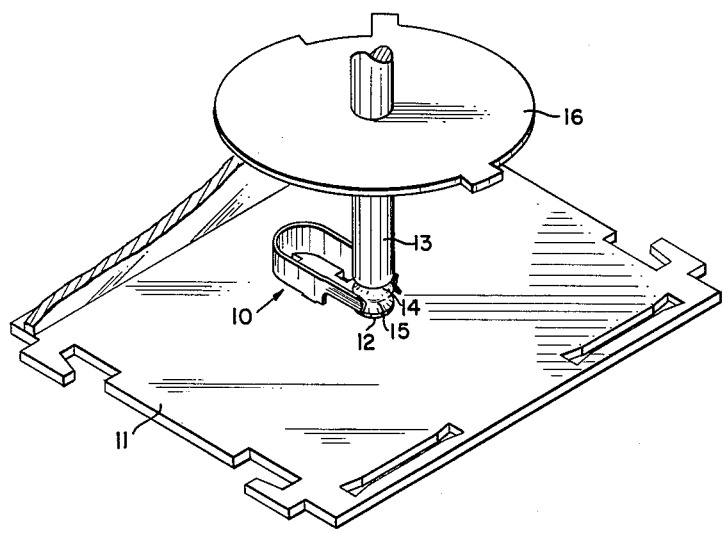
FIGURE 1 is a pictorial view of a timer switch end plate with the indexing clip of the present invention disposed thereon.

Referring now to FIGURE 1 of the drawings, U-shaped clip 10 of the present invention is shown affixed to timer end plate 11. Extending through aperture 12 of plate 11, and free to rotate with respect thereto, is timer shaft 13. Disposed on time shaft 13 is a pair of circumferential indexing grooves 14 and 15. Also shown on timer shaft 13 is one of a series of program cams, indicated by reference numeral 16.

Figure 2:
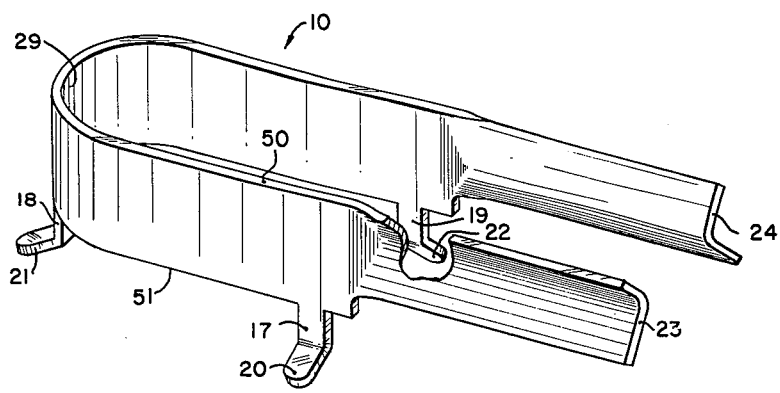
FIGURE 2 is an enlarged pictorial view of the indexing clip of the present invention.

With reference now to FIGURE 2, mounting tangs 17, 18 and 19 are seen as an integral part of U-shaped clip 10. Preformed ends 20, 21 and 22 are angulated with respect to the main body of said mounting tangs. The extremities of said pre-formed ends are rounded to facilitate the attachment of clip 10 to plate 11. Integrally formed on clip 10 and disposed opposite the U-shaped portion 29, and at the free ends thereof are spring fingers 23 and 24. Said fingers feature a V-shaped cross section adapted to engage circumferential grooves 14 and 15 of timer shaft 13. Clip 10 has top and bottom sides 50 and 51 respectively.

Figure 3:
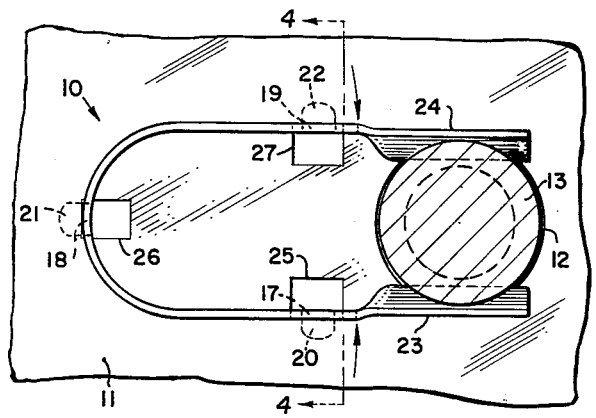
FIGURE 3 shows a top view of the indexing clip mounted on the timer end plate with the free ends engaging the timer shaft.
Figure 4:
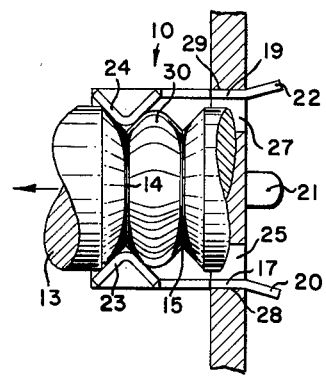
FIGURE 4 is a section view taken along line 4—4 of FIGURE 3.

FIGURE 3 illustrates a top view of clip 10 in the installed position on timer end plate 11. Plate 11 has been punched to provide aperture 12 for timer shaft 13. Clip mounting holes 25, 26 and 27 have also been provided in plate 11 at determined locations with respect to aperture 12. Holes 25, 26 and 27 are dimensioned and located so as to allow easy installation of the pre-formed ends of mounting tangs 17, 18 and 19 respectively. Upon assembly of U-shaped clip 10, to timer plate 11, and before timer shaft 13 is inserted into aperture 12, pre-formed end 21 of mounting tang 18 is inserted into aperture 26. Pressure is then exerted against plate 11 and on opposing sides of the U-shaped clip 10 in the direction of the arrows in FIGURE 3 until pre-formed ends 20 and 22 of mounting tangs 17 and 19 are engaged in their respective apertures 25 and 27. Upon entry of the pre-formed ends 20 and 22, pressure is then released in the opposite direction of the arrows and due to the resilient force of the U-shaped clip 10, tangs 17 and 19 are retained against portions 28 and 29 of apertures 25 and 27 respectively. After U-shaped clip 10 has been snapped into position, the timer shaft 13 is then inserted into aperture 12, and between the spring fingers 23 and 24, in the direction of the arrow in FIGURE 4 coming to rest with the V-shaped portion on fingers 23 and 24 embracing circumferential groove 14 thereby rigidly securing shaft 13 in a preselected position. Upon greater movement on the direction of the arrow spring fingers 23 and 24 are forced outwardly from the shaft 13, by means of convexed portion 30, on shaft 13. Upon greater movement spring fingers 23 and 24 are forced to lodge in the second circumferential groove 15 thereby establishing a new axial position of the timer shaft 13.

Figure 5:
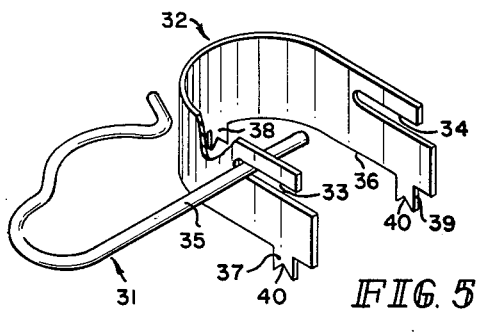
FIGURE 5 shows a two-piece variation of the indexing clip utilizing a hairpin type spring wire.
Figure 6:
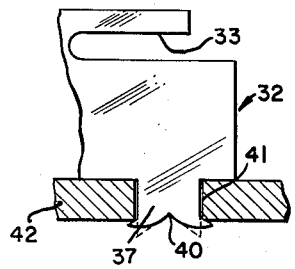
FIGURE 6 illustrates the use of staked-in mounting tangs on the two-piece clip embodiment.

Referring now to FIGURE 5 there is illustrated a modified embodiment using a spring wire hairpin clip 31, in conjunction with a U-shaped snap in and/or staked in clip 32 utilizing generally the same shape as the previously disclosed U-shaped clip 10. Clip 32 has provided thereon two (2) elongated slots 33 and 34 for holding and locating the straight portion 35 of hairpin clip 31. Located on bottom surface 36, and projecting therefrom and integral with the main body of clip 32 are mounting tangs 37, 38 and 39. These tangs are illustrated better in FIGURE 6 and generally shows at 37, said tangs are formed with an inverted V shaped notch 40 to be swaged or bent apart after tang 37 has been placed into position and through aperture 41, in timer plate 42.

Figure 7:
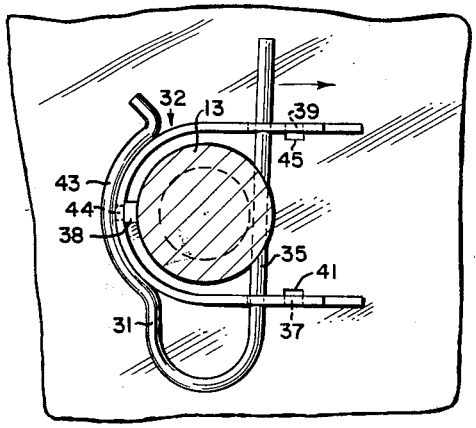
FIGURE 7 is a top view of the two-piece clip mounted on a timer end plate and disposed around a timer shaft.

Referring now to FIGURE 7 the hairpin clip 31 is located in its operating position in U-shaped clip 32 and held in the first circumferential groove 14 located in shaft 13. It can be easily seen how the hairpin clip 31 is retained in its proper transverse position by means of the curved portion 43 of hairpin clip 31 embracing the U-shaped portion of the U-shaped clip 31. The U-shaped clip 32, is held securely to the plate by said mounting tangs 37, 38 and 39 in their respective apertures 41, 44 and 45 by means of said swaging process. Upon axial movement of timer shaft 13, the straight portion is forced away from shaft 13 and transversely along slots 33 and 34, which can be seen more clearly in FIGURE 5 in the direction of the arrow until greater movement of the timer shaft allows portion 35 to come to rest in the next circumferential groove in shaft 13.

Thus by my invention I have provided an axial indexing clip of simple construction and inexpensive design which may be assembled easily to a timer carrying a rotatable shaft. Although I have illustrated and described a preferred embodiment of my invention, I do not wish to be limited thereby as the scope of my invention is best defined by the following claims.

I claim:

1. An indexing means for an axially movable shaft, said indexing means comprising: grooves cut in said shaft; a base, said base having apertures cut therethrough, said indexing means further comprising unitarily formed bowed means having a pair of free ends, said free ends having a pair of dependencies extending from a side thereof penetrating said base through said apertures, means on said dependencies for clutching said dependencies to said base, and gripping means connected to said bowed means falling within one of said grooves of said shaft to position the same upon axial movement thereof through said base.

2. An indexing means for an axially movable shaft, said indexing means comprising: grooves cut in said shaft; a base, said base having apertures cut therethrough, said indexing means further comprising a unitarily U-shaped means having a pair of free ends, said free ends having a pair of dependencies extending from a side thereof penetrating said base through said apertures, means on said dependencies for clutching said dependencies to said base, and finger gripping means connected to said U-shaped means falling within one of said grooves of said shaft to position the same upon axial movement thereof through said base.

3. An indexing means for an axially movable shaft, said indexing means comprising: grooves cut in said shaft; a base, said base having apertures cut therethrough, said indexing means further comprising a unitarily formed bowed means having a pair of free ends, said free ends having a pair of dependencies extending from a side thereof penetrating said base through said apertures, means on said dependencies for clutching said dependencies to said base, and finger-like means connected to said bowed means falling within one of said grooves of said shaft to position the same upon axial movement thereof through said base.

4. An indexing means for an axially movable shaft, said indexing means comprising: grooves cut in said shaft; a support means, said support means having apertures cut therethrough, said indexing means further comprising a unitarily formed bowed spring having a pair of free ends, said free ends having a pair of dependencies extending from a side thereof penetrating said base through said apertures, means on said dependencies for clutching said dependencies to said support means, and gripping means held by said bowed springs falling within one of said grooves of said shaft to position the same upon axial movement thereof through said base.

5. An indexing means for an axially movable shaft, said indexing means comprising: grooves cut in said shaft; a base, said base having apertures cut therethrough, said indexing means further comprising a bowed means having a pair of free ends, said free ends being slotted and having a pair of dependencies extending from a side thereof penetrating said base through said apertures, means on said dependencies for clutching said dependencies to said base, and gripping means in said slots of said free ends falling within one of said grooves of said shaft to position the same upon axial movement thereof through said base.

6. An indexing means for an axially movable shaft, said indexing means comprising: grooves cut in said shaft, a base, said base having apertures cut therethrough said indexing means further comprising a unitarily formed flat bowed spring having a pair of free ends, said free ends having dependencies extending from a side thereof penetrating said base through said apertures, means on said dependencies for clutching said dependencies to said base, and gripping means connected to said bowed spring falling within one of said grooves of said shaft to position the same upon axial movement thereof through said base.

7. An indexing means for an axially movable shaft, said indexing means comprising: grooves cut in said shaft; a base, said base having apertures cut therethrough, said indexing means further comprising a unitarily formed flat bowed spring having a pair of free ends, said free ends having a pair of dependencies extending from a side thereof penetrating said base through said apertures, means on said dependencies for clutching said dependencies to said base, and finger means having a rounded center connected to said bowed spring falling within one of said grooves of said shaft to position the same upon axial movement thereof through said base.

8. An indexing means for an axially movable shaft, said indexing means comprising: grooves cut in said shaft; a base, said base having apertures cut therethrough, said indexing means further comprising a unitarily formed bowed spring having a pair of slotted free ends, said free ends having a pair of dependencies extending from a side thereof penetrating said base through said apertures, means on said dependencies for clutching said dependencies to said base, and wire means in said slotted free ends of said spring falling within one of said grooves of said shaft to position the same upon axial movement thereof through said base.

9. An indexing means for an axially movable shaft, said indexing means comprising grooves cut in said shaft; a base, said base having apertures cut therethrough, said indexing means further comprising a unitarily formed flat, bowed spring having a pair of slotted free ends, said free ends having a pair of dependencies extending from a side thereof penetrating said base through said apertures, means on said dependencies for clutching said mounting means to said base, and wire means in said slotted free ends of said spring falling within one of said grooves of said shaft to position the same upon axial movement thereof through said base.

References Cited by the Examiner

UNITED STATES PATENTS

| | | | |
|---|---|---|---|
| 1,641,396 | 9/27 | Norviel | 74—503 |
| 1,942,273 | 1/34 | Bosworth et al. | 74—503 |
| 2,491,315 | 12/49 | Johnson | 74—527 |
| 2,684,142 | 7/54 | Willyard et al. | 74—527 X |

BROUGHTON G. DURHAM, *Primary Examiner.*